United States Patent [19]
Lodi et al.

[11] Patent Number: 6,053,517
[45] Date of Patent: Apr. 25, 2000

[54] SUPPORT FOR THE MUDGUARD OF A STEERING WHEEL OF A MACHINE, IN PARTICULAR FOR THE STEERING WHEEL OF AN AGRICULTURAL TRACTOR

[75] Inventors: Enzo Lodi; Elios Lodi, both of Fabbrico, Italy

[73] Assignee: Lodi Luigi & Figli S.r.l., Italy

[21] Appl. No.: 09/316,535

[22] Filed: May 21, 1999

[51] Int. Cl.⁷ .................................................. B62D 25/18
[52] U.S. Cl. ........................... 280/157; 180/900; 172/509
[58] Field of Search ...................... 280/157, 156, 280/98, 103, 159, 160, 851, 847, 848, 857, 859; 180/900; 172/112, 508, 509; 296/198; 248/297

[56] References Cited

U.S. PATENT DOCUMENTS

| | | |
|---|---|---|
| 5,074,573 | 12/1991 | Dick ........................................ 280/157 |
| 5,169,167 | 12/1992 | Willson et al. . |

FOREIGN PATENT DOCUMENTS

| | | |
|---|---|---|
| 1000592 | 2/1989 | Belgium . |
| 0850820 | 7/1998 | European Pat. Off. . |
| 3214901 | 10/1983 | Germany ............................. 280/847 |

*Primary Examiner*—Richard M. Camby
*Attorney, Agent, or Firm*—Hedman, Gibson & Costigan, P.C.

[57] ABSTRACT

A mud flap support for a tractor allows the wheels to be steered while maintaining the attitude of the mud flap constant. The support has three elements with a preloaded spring between the axle and one of the elements of the support.

6 Claims, 2 Drawing Sheets

SUPPORT FOR THE MUDGUARD OF A STEERING WHEEL OF A MACHINE, IN PARTICULAR FOR THE STEERING WHEEL OF AN AGRICULTURAL TRACTOR

The present invention refers to a support for the mudguard of a steering wheel of an agricultural machine, in particular for the mudguard of a steering wheel of an agricultural tractor.

Supports, according to the first part of claim 1, are currently known.

Using said supports, the maximum steering angle is limited since the mudguard interferes with the other parts of the machine. More precisely, by steering to the right, the rear portion of the right mudguard interferes with the other parts of the machine; by steering to the left, the rear portion of the left mudguard interferes with the other parts of the machine. The inconveniences due to such situation are particularly evident for the agricultural tractors since the reduction of the steering angle because of said situation causes many and annoying inconveniences which are well known to the experts and thus not listed for the sake of brevity. Shortly, an increase of the steering room causes a significant loss in the machine handling which usually means a reduction of the usable area near the field edges or an increase of the manoeuvres and thus of the dead times.

Currently, in order to overcome the above inconveniences, the farmer, once arrived at the ploughing field, removes the mudguards which have to be mounted back, at the end of the farm work, before driving on the roads open to the general traffic.

The removal of the mudguards from the steering wheels allows the tractor to work with the maximum steering angle, however this solution is not satisfactory since it requires time and it is very difficult if conducted under the conditions of fixing means wear and/or of poor lighting, for instance during the night ploughing.

The purpose of the present invention is to overcome the above mentioned inconvenience, i.e. to provide a mudguard support suitable to allow the tractor to work at the maximum steering angle without the mudguard interfering with the other parts of the machine.

Said purposes are achieved by a mudguard support as claimed in claim 1, which is taken as reference for the sake of brevity. The fact that the rotation axis of said third rotating element coincides with the hub steering axis is one of the conditions which assures the best working capabilities of the support. In the case said axes do not coincide, the working capabilities of the support will be reduced (down to zero) as much as said axes are separated.

During the steering operation, the mudguard follows the wheel (by staying still with respect to said wheel) up to a rotation angle where the mudguard is practically in contact with the other parts of the machine without, however, touching them. Once this configuration is realised, the abutment element suitable to oppose the axle becomes operative and the second element (and therefore the connected mudguard) stops with respect to the axle and with respect to the machine thus avoiding the contact. However, the wheel continues its rotation and reaches the maximum steering capacity. The spring, positioned between the first and the second element, is further loaded.

A preferred embodiment is described hereinafter through a non limiting example, said embodiment refers to a support for mudguard right steering tire wheel of an agricultural tractor.

The support for the mudguard of the front left steering tire wheel is mirror-like identical and therefore will not be considered for the sake of brevity.

The invention is disclosed through said specific embodiment since the above inconveniences are particularly evident in the case of the agricultural tractors. The invention can therefore be applied to other machines which can or cannot perform operations.

FIG. 1 an elevation view, in partial cross section, of a support according to the invention.

Figure 1:
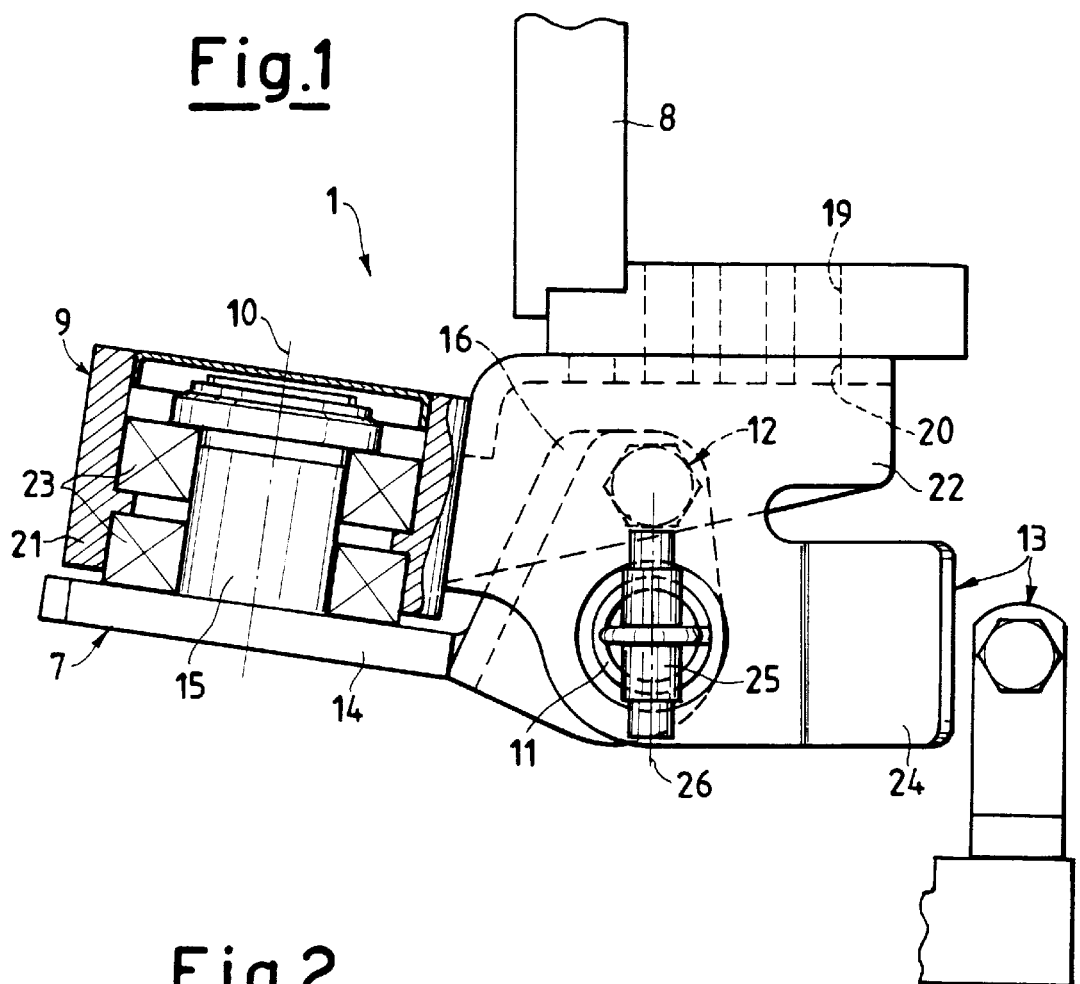
Figure 2:
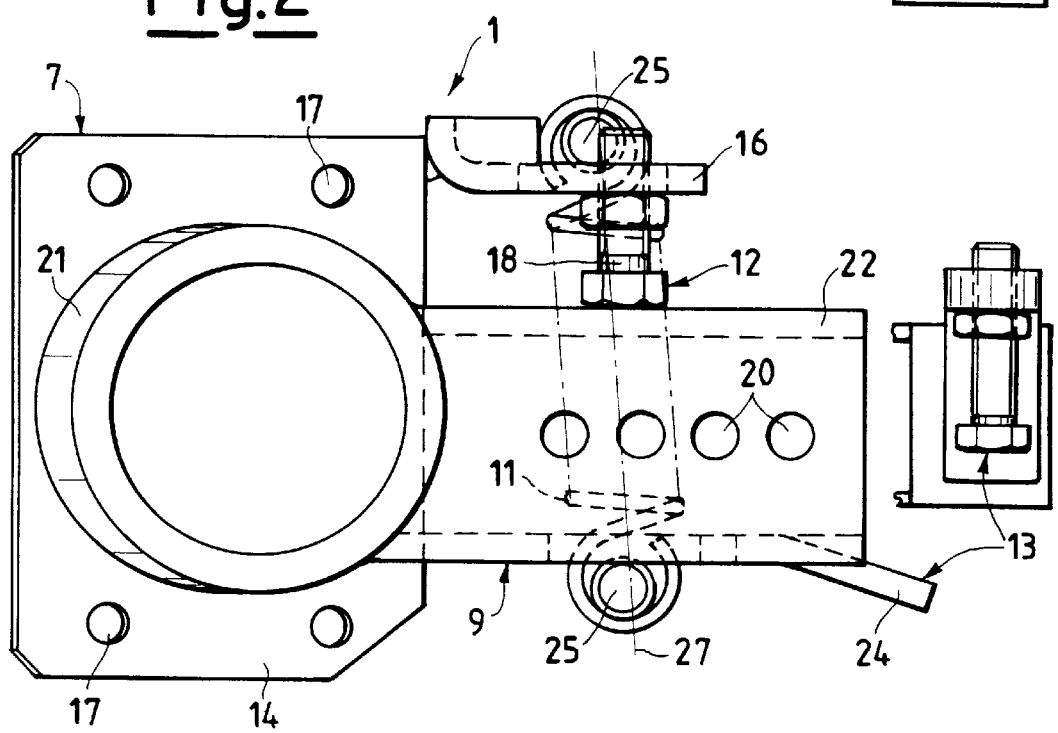
FIG. 2 is a partial plan view.
Figure 3:
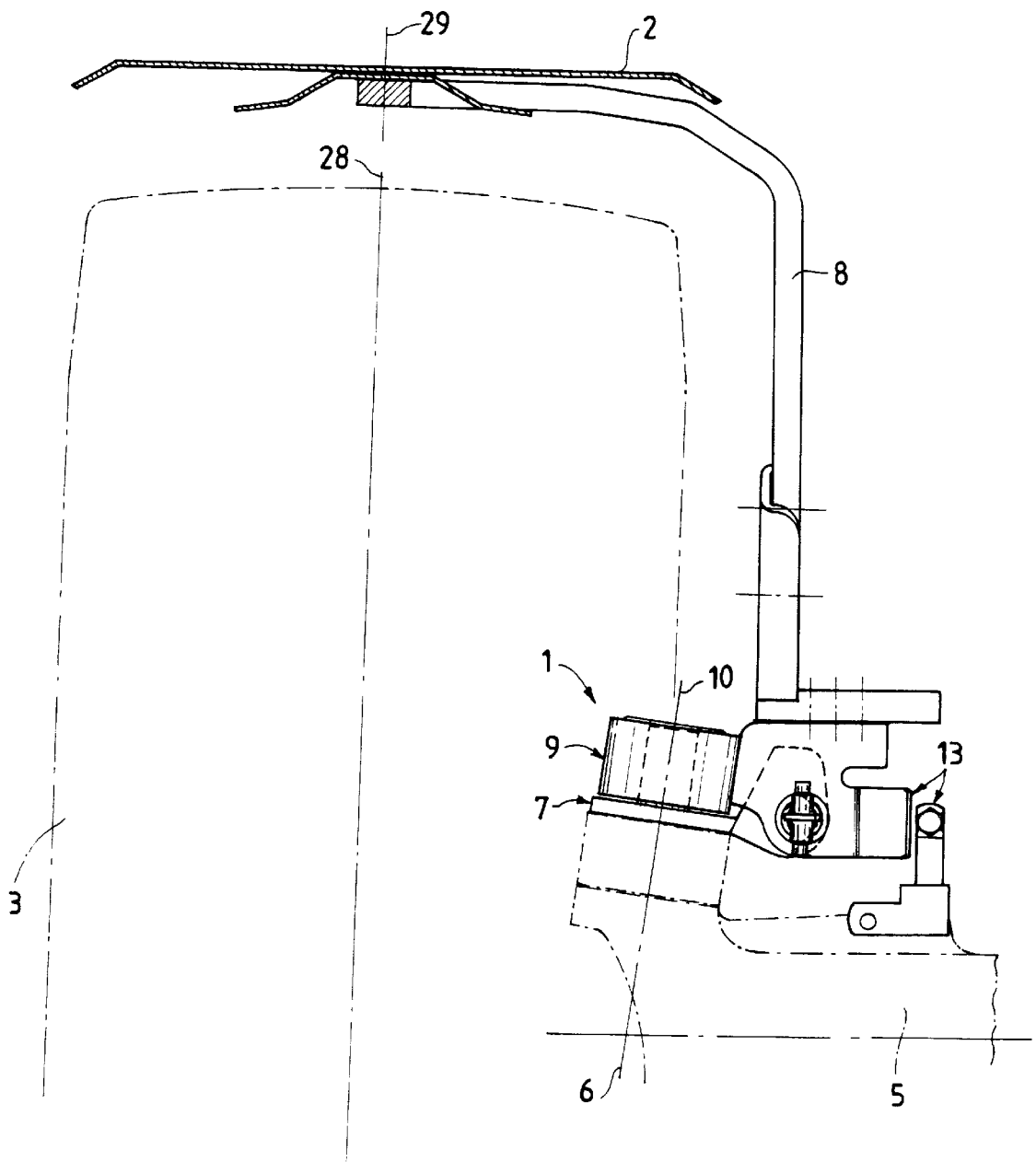
FIG. 3 is a view of the support applied to an axle.

With reference to the above said views, the support 1 of the illustrated mudguard 2 is suitable to be applied to a steering wheel 3 of an agricultural tractor (not shown). The steering wheel 3 comprises a hub linked to the axle 5 of the machine and which rotates with respect to the steering axis 6.

The support 1 comprises substantially a first element 7 which can be linked to the axle 5 of the vehicle and a second element 8 which can be linked to the mudguard 2, and an interposed third element 9. The second element 8 is connected to the first element 7 through said interposed third rotating element 9 which has the rotation axis 10 that coincides with the steering axis 6 of the hub. A preloaded spring 11 is also positioned between said first element 7 which can be linked to the axle 5 of the vehicle and said third element 9, said spring keeps, through an abutment element 12, said first element 7 and said third element 9 in such a reciprocal position whereby the rolling plane 28 of the steering wheel 3 contains the centre axis 29 of the mudguard 2. The third element 9 is provided with a second abutment element 13 suitable to oppose the axle 5 when the actual steering angle coincides with the maximum steering angle thus causing (through the increase of the steering angle) the rotation of the mudguard 2 to stop with respect to the axle 5 i.e. the progressive divergence of the rolling plane 28 of the steering wheel 3 with respect to the centre axis 29 of the mudguard 2.

The first element 7 can be linked to the axle 5 of the vehicle and, in the example case, comprises a first flat plate 14, a first pin 15 and a first flange 16. The first flat plate 14 comprises the first series of through holes 17 suitable to engage with screw means to fix said plate to the axle 5. The first pin 15 is perpendicularly connected to said first flat plate 14 along the steering axis 6 and the rotation axis 10. The first flange 16 belongs to the first abutment element 12 and supports a first adjustment bolt 18. The second element 8 has a first end which can be linked to the mudguard 2 and a second end which can be linked to the third rotating element 9 by means of a series of second through holes 19 which coincides with a series of third through holes 20 positioned on the third rotating element 9. In the example case, the third rotating element 9 comprises a couple of bearings 23, a tubular portion 21 and a second flange 22. Each bearing 23 works with respect to the steering axis 6 and to the rotation axis 10 and is contained within the tubular portion 21 which is connected to one of the two ends of a second flange 22 which comprises an extension 24 which belongs to the second abutment element 13. The remaining portion of the second abutment element is positioned on the axle 5 and is preferably a bolt so as to allow possible adjustments. Preferably, the bearings 23 are of the roller type and the spring 11 is of the helicoidal type which can extend along its own axis 27. The spring 11 is fixed at the ends by means of pins 25 which have axes 26 perpendicular to the axis 27 of the spring 11.

It is sufficient to fix the first flat plate 14 to the axle 5 to realise the assembly. During the initial phase of the steering manoeuvre, the support 1 has the characteristics of a unitary element because of the action of the spring 11 which keeps the first element 7 and the third element 9 in an integral form. When the rear portion of the mudguard is close to be in contact with the remaining portion of the machine, the flange 24 of the second abutment element 13 abuts against the axle 5 or against a portion integral thereto. The third element 9 is therefore stopped with respect to the axle 5 notwithstanding the steering angle increase. The bearings 23 start working since the first element 7 and the third element 9 rotate reciprocally with respect to the steering axis 6 and to the rotation axis 10 which coincides. As a consequence, also the second element 8 and the mudguard 2 stop with respect to the axle and therefore with respect to the remaining portion of the machine notwithstanding the continuous growth of the steering angle. The spring 11 is further loaded. During the realignment of the wheels, the spring 11 brings the first element 7 and the third element 9 back to the starting position up to the point where the portions of the first abutment element 12 are engaged again.

We claim:

1. A support (1) for the mudguard of a steering wheel of a machine, in particular for the mudguard (2) of a steering wheel (3) of an agricultural tractor, wherein said steering wheel (3) comprises a hub which is linked to the axle (5) of the machine and which can rotate with respect to the steering axis (6), wherein said support (1) comprises a first element (7) which can be fixed to the vehicle axle (5) and a second element (8) which can be fixed to the mudguard (2), characterised in that:

the second element (8) is connected to the first element (7) through an interposed third rotating element (9), wherein said third rotating element (9) has the rotation axis (10) which coincides with the steering axis (6) of the hub (4), a preloaded spring (11) is positioned between said first element (7), which can be fixed to the vehicle axle (5), and said third element (9), said spring keeps, through a first abutment element (12), said first element (7) and said third element (9) in such a reciprocal position whereby the rolling plane (28) of the steering wheel (3) contains the centre axis (29) of the mudguard (2), said third element (9) is provided with a second abutment element (13) suitable to oppose the axle (5) when the actual steering angle is close to coincide with the maximum steering angle thus causing the rotation of the mudguard (2) to stop with respect to the axle (5) i.e. the progressive divergence of the rolling plane (28) of the steering wheel (3) with respect to the centre axis (29) of the mudguard (2).

2. A support as claimed in claim 1, characterised in that the first element (7) which can be fixed to the vehicle axle (5) comprises a first flat plate (14), a first pin (15) and a first flange (16), wherein: said first flat plate (14) comprises a series of first through holes (17) suitable to be engaged by screw means to fix said plate to the axle (5), said first pin (15) is perpendicularly engaged to said first flat plate (14) along the steering axis (6) and the rotation axis (10), said first flange (16) belongs to the first abutment element (12) and supports a first adjustment bolt (18).

3. A support as claimed in claim 1, characterised in that the second element (8) has one first end which can be fixed to the mudguard (2) and a second end which can be fixed to the third rotating element (9) by means of a series of second through holes which coincide with a series of third through holes (20) positioned on the third rotating element (9).

4. A support as claimed in claim 1, characterised in that the third rotating element (9) comprises at least one bearing (23), a tubular portion (21), a second flange (22), wherein said bearing (23) works with respect to the steering axis (6) and to the rotation axis (10) and is contained within the tubular portion (21) which is connected to one of the two ends of a second flange (22) and wherein said second flange (22) comprises an extension (24) which belongs to the second abutment element (13).

5. A support as claimed in claim 4, characterised in that the bearing (23) is of the roller type.

6. A support as claimed in claim 1, characterised in that the spring (11) is of the helicoidal type which can extend along its own axis (27) and which can be fixed at the ends by means of pins (25) which have the axes (26) perpendicular to the axis (27) of the spring (11).

* * * * *